US012088693B2

(12) United States Patent
Hopkins

(10) Patent No.: US 12,088,693 B2
(45) Date of Patent: Sep. 10, 2024

(54) MODIFIABLE CLIENT-SIDE ENCRYPTED DATA IN THE CLOUD

(71) Applicant: Skyhigh Security LLC, Plano, TX (US)

(72) Inventor: Roy Douglas Hopkins, Worthing (GB)

(73) Assignee: Skyhigh Security LLC, Plano, TX (US)

( * ) Notice: Subject to any disclaimer, the term of this patent is extended or adjusted under 35 U.S.C. 154(b) by 321 days.

(21) Appl. No.: 17/351,706

(22) Filed: Jun. 18, 2021

(65) Prior Publication Data
US 2021/0314144 A1    Oct. 7, 2021

Related U.S. Application Data

(63) Continuation of application No. 16/141,816, filed on Sep. 25, 2018, now Pat. No. 11,044,077.

(51) Int. Cl.
| | | |
|---|---|---|
| *H04L 9/08* | (2006.01) | |
| *G06F 16/27* | (2019.01) | |
| *G06F 21/60* | (2013.01) | |
| *H04L 9/14* | (2006.01) | |

(52) U.S. Cl.
CPC ............... *H04L 9/08* (2013.01); *G06F 16/27* (2019.01); *G06F 21/602* (2013.01); *H04L 9/14* (2013.01)

(58) Field of Classification Search
CPC ... H04L 9/08; H04L 9/14; G06F 16/27; G06F 21/602
See application file for complete search history.

(56) References Cited

U.S. PATENT DOCUMENTS

| | | | |
|---|---|---|---|
| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |

(Continued)

FOREIGN PATENT DOCUMENTS

| | | |
|---|---|---|
| CN | 102014133 | 4/2011 |
| WO | 2017210563 A1 | 12/2017 |

(Continued)

OTHER PUBLICATIONS

InnovationQ+ (Year: 2023).*

(Continued)

*Primary Examiner* — Samson B Lemma
*Assistant Examiner* — Richard W Cruz-Franqui
(74) *Attorney, Agent, or Firm* — Byrne Poh LLP

(57) ABSTRACT

Particular embodiments described herein provide for a system that can be configured to receive a notification that a client device is requesting, to modify original data associated with an online application, wherein the original data is stored in encrypted format in a cloud; decrypt the original data using a first client encryption key; store the decrypted data in a location accessible by the online application; enable editing capability of the decrypted data; receive a notification that the client device is finished modifying the data in decrypted format; determine whether the original data in decrypted format was modified; encrypt, based on a determination that the original data was modified, the modified data using a second client encryption key; and upload the modified data in encrypted format to the cloud.

17 Claims, 10 Drawing Sheets

(56) References Cited

U.S. PATENT DOCUMENTS

| | | | |
|---|---|---|---|
| 7,685,646 B1* | 3/2010 | Hug | G11B 20/00173 |
| | | | 713/160 |
| 8,577,823 B1* | 11/2013 | Gadir | G06N 5/025 |
| | | | 706/45 |
| 8,656,159 B1 | 2/2014 | Donahue | |
| 9,009,848 B2* | 4/2015 | Orsini | H04L 63/04 |
| | | | 726/28 |
| 9,219,753 B2 | 12/2015 | Fleischman et al. | |
| 9,246,676 B2* | 1/2016 | Leavy | H04L 63/06 |
| 9,246,678 B2 | 1/2016 | Nayshtut et al. | |
| 9,270,663 B1* | 2/2016 | Kravitz | H04L 63/061 |
| 9,455,831 B1* | 9/2016 | Grubbs | H04L 9/008 |
| 9,679,155 B1 | 6/2017 | Grubbs | |
| 9,736,127 B2 | 8/2017 | Fleischman et al. | |
| 10,015,173 B1* | 7/2018 | Efstathopoulos | H04L 63/0442 |
| 2002/0194199 A1 | 12/2002 | Flank | |
| 2010/0122120 A1* | 5/2010 | Lin | H04L 41/06 |
| | | | 714/E11.178 |
| 2012/0170749 A1 | 7/2012 | Rich et al. | |
| 2012/0324365 A1* | 12/2012 | Momchilov | G06F 3/14 |
| | | | 715/738 |
| 2013/0275470 A1* | 10/2013 | Cao | H04L 67/1097 |
| | | | 707/781 |
| 2013/0297622 A1* | 11/2013 | Clinchant | G06F 16/93 |
| | | | 707/E17.084 |
| 2013/0297662 A1* | 11/2013 | Sharma | H04W 12/08 |
| | | | 707/827 |
| 2014/0082350 A1* | 3/2014 | Zarfoss, III | H04L 63/083 |
| | | | 713/155 |
| 2014/0082749 A1* | 3/2014 | Holland | G06F 21/60 |
| | | | 726/29 |
| 2014/0208409 A1* | 7/2014 | Maidl | H04L 63/0853 |
| | | | 726/9 |
| 2014/0236756 A1 | 8/2014 | Bourke et al. | |
| 2014/0281477 A1* | 9/2014 | Nayshtut | H04L 9/0825 |
| | | | 713/150 |
| 2015/0074409 A1* | 3/2015 | Reid | G06F 21/6218 |
| | | | 713/171 |
| 2015/0244684 A1* | 8/2015 | Ng | H04L 63/0428 |
| | | | 713/168 |
| 2016/0277374 A1 | 9/2016 | Reid et al. | |
| 2017/0104736 A1* | 4/2017 | Seul | H04L 63/0428 |
| 2018/0232526 A1 | 8/2018 | Reid et al. | |
| 2020/0099515 A1* | 3/2020 | Hopkins | H04L 9/0891 |

FOREIGN PATENT DOCUMENTS

| | | |
|---|---|---|
| WO | 2020068640 A1 | 4/2020 |
| WO | WO 202068640 | 4/2020 |

OTHER PUBLICATIONS

NPL History Search (Year: 2023).*
NPL Search Google Scholar; 2 pages (2021).
International Search Report and Written Opinion dated Jan. 17, 2020 in International Application No. PCT/US2019/052385, pp. 1-9.
International Preliminary Report on Patentability dated Apr. 8, 2021 in International Application No. PCT/US2019/052385, pp. 1-7.
Notice of Allowance dated Mar. 1, 2021 in U.S. Appl. No. 16/141,816, pp. 1-30.
Office Action dated Aug. 10, 2020 in U.S. Appl. No. 16/141,816, pp. 1-34.
Extended European Search Report dated May 24, 2022 in EP Patent Application No. 19867415.2, pp. 1-8.
International Search Report dated Aug. 23, 2017 in PCT Application No. PCT/US2017/035695, pp. 1.
U.S. Appl. No. 16/141,816, filed Sep. 25, 2018, pp. 1-47.

* cited by examiner

MODIFIABLE CLIENT-SIDE ENCRYPTED DATA IN THE CLOUD

CROSS REFERENCE TO RELATED APPLICATION

This Application is a continuation (and claims benefit of priority under 35 U.S.C. § 120) of U.S. application Ser. No. 16/141,816, filed Sep. 25, 2018, entitled "MODIFIABLE CLIENT-SIDE ENCRYPTED DATA IN THE CLOUD." The disclosure of this prior application is considered part of (and is incorporated by reference in) the disclosure of this application.

TECHNICAL FIELD

This disclosure relates in general to the field of secure network storage systems, and more particularly, to a secure cloud storage system with client-side encrypted data.

BACKGROUND

The field of network security has become increasingly important in today's society. In particular, a cloud network can provide a medium for exchanging data between different devices connected to different computer networks. While the use of a network has transformed business and personal communications, it has also been used as a vehicle for malicious operators to gain unauthorized access to computers and computer networks and for intentional or inadvertent disclosure of sensitive information.

In a cloud computing system, confidential information is stored, transmitted, and used by many different information processing systems. Techniques have been developed to provide for the secure handling and storing of information, including, for example, encryption of information by a client manager, which may be stored on a cloud service provider and viewed via an online application. However, these techniques prevent many features provided by the cloud service provider platform from working, including editing and previewing content within the online application.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1A:
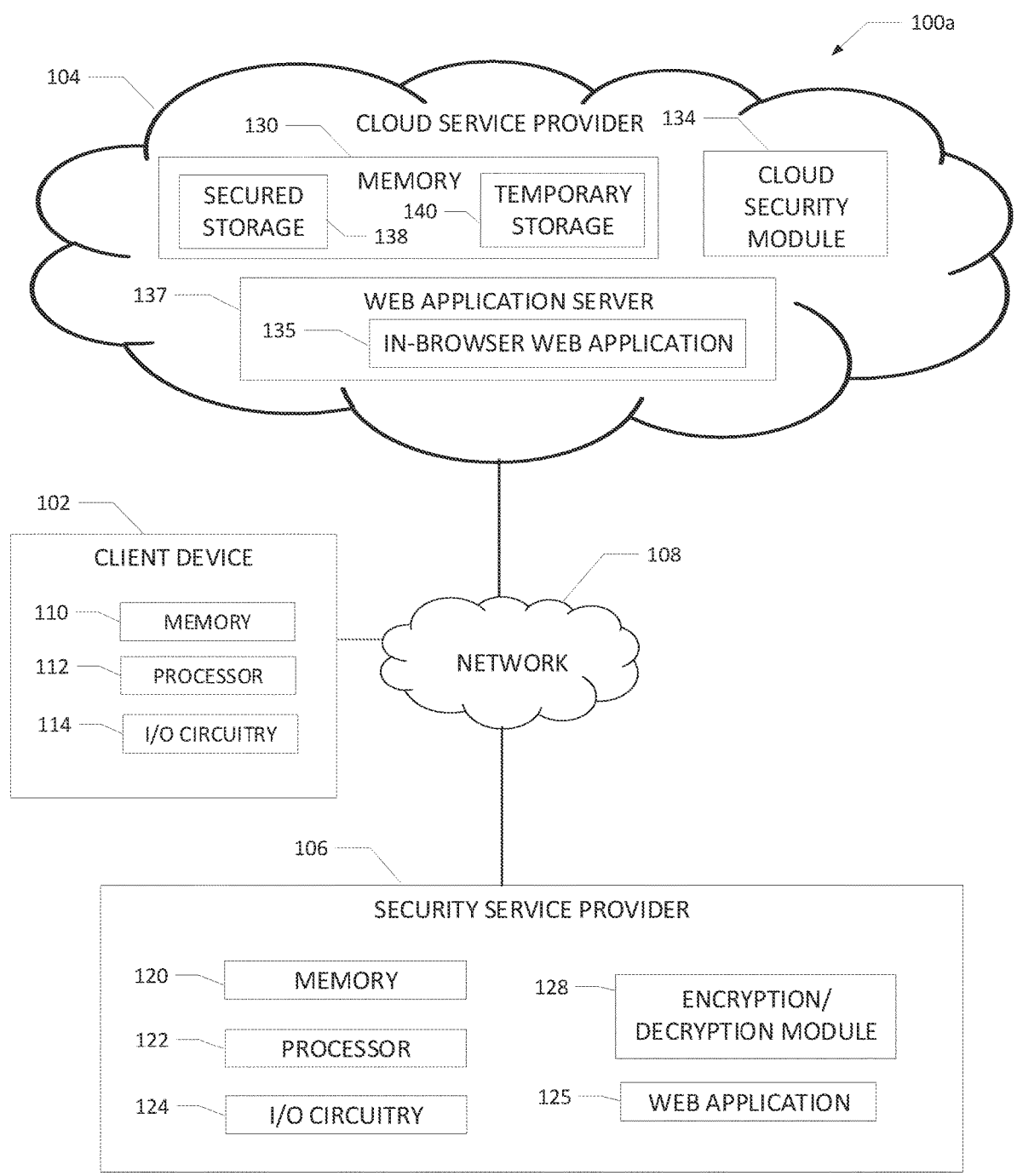
FIG. 1A is a simplified block diagram of an example communication system for a security service provider, in accordance with an embodiment of the present disclosure.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

The following detailed description sets forth example embodiments of apparatuses, methods, and systems relating to a communication system for enabling the modification of client-side encrypted information stored in a cloud. Features such as structure(s), function(s), and/or characteristic(s), for example, are described with reference to one embodiment as a matter of convenience; various embodiments may be implemented and may include one or more of the described features. For convenience, the phrase "FIG. 1" may be used to refer to the collection of drawings of FIGS. 1A-1B.

A cloud storage service provider enables a user to store data, such as computer files and other information, in a remote storage destination located "online" or "in the cloud". The remote storage destination may be located away from a user's computing node and may communicate with the user's computing node via a local area network (LAN), a wide area network (WAN), and/or the Internet. The remote storage destination device may include a cloud storage service provider, which may provide remote storage, in-browser viewing, and/or data searching, among others. The cloud storage network may be owned and/or operated by a third party. Cloud-based storage provides a convenience for the user, also referred to herein as the client, in that the hardware associated with such storage is maintained by the third party. Information stored in the cloud may be accessed via various computing nodes located in dispersed geographic locations. Information stored in the cloud may be encrypted to prevent unauthorized access. A cloud storage service provider may encrypt information after the information is received but before the information is stored, or the cloud storage service provider may determine that information stored unencrypted should be stored encrypted, may encrypt the information, and may overwrite the unencrypted information with the encrypted information. Further, information may be encrypted on the client-side before being sent to the cloud storage service provider and, then, once received, may undergo additional encryption at the cloud storage service provider before the information is stored.

When information is encrypted at the client-side, the cloud storage service provider may not recognize the encrypted format, such that in-browser functionality may be disabled. For example, a cloud service provider may not be able to decipher client-side encrypted data and may disable one or more functionalities of the in-browser web application associated with the data (e.g., disable the data from being viewed, exported, and/or modified). As used herein, the term "online application" may refer to an application that runs within a web browser or a native application that is web enabled, such as Microsoft® Office 365, and may refer to an "in-browser web application" and a "web application." As used herein, the term "cloud services," "cloud storage service provider," and "cloud service provider" may be used interchangeably. As used herein, the term "security manager" and "security service provider" may be used interchangeably. The following embodiments enable client-side encrypted data to be viewed and/or modified by the associated cloud service in-browser web application via a security service provider. As used herein, the term "client-side encryption" and variations (e.g., "client-side encrypted") refers to encryption of data that is performed and/or managed on the client side, and may include client-supplied encryption keys, client-managed encryption keys, client encryption, and a security service provider that is authorized by the client to encrypt data and manage encryption keys. More generally, "client-side encryption" refers to data that is encrypted using keys that are not accessible to the cloud service provider. As used herein, the term "client-encryption," and variations (e.g., "client-encrypted") refers to a client-side encryption where the encryption keys are managed only by the client, and the encryption/decryption of data is performed at the client device.

FIG. 1A is a simplified block diagram of a communication system 100a that enables viewing and/or modifying of client-side encrypted data stored in a cloud, in accordance with an embodiment of the present disclosure. As illustrated in FIG. 1A, an embodiment of communication system 100a can include a client device 102, cloud service provider 104, and a security service provider 106. Client device 102 may be an electronic device and may include memory 110, a processor 112, and input/output (I/O) circuitry 114. Cloud service provider 104 may include memory 130, a cloud security module 134, a web application server 137, and an in-browser web application 135. Memory 130 may include secured storage 138 and temporary storage 140. The cloud security module 134 may perform additional encryption and decryption of information once received by the cloud service provider 104. The cloud security module 134 may encrypt and decrypt information for a client using a single key, such that all information for a client is encrypted and decrypted together (e.g., information is not encrypted individually instead a client's information is encrypted and decrypted as a unit using one key). Security service provider 106 may include memory 120, a processor 122, I/O circuitry 124, an encryption/decryption module 128, and a web application 125. Electronic device 102, cloud service provider 104, and security service provider 106 may be in communication using network 108.

Cloud service provider 104 may include an in-browser web application 135 that runs within a browser on the client device and communicates with an application program interface (API) provided by the cloud service provider 104 to enable the client device to access data stored in the cloud. The web application server 137 serves the in-browser web application 135 to the client device 102 to enable access to data stored in the cloud. In some embodiments, the web application server 137 may cause an alternate web application to be served to the client device 102, such as web application 125 on the security service provider 106. For example, the cloud service provider 104 may delegate access to data that is not recognized by the cloud service provider 104 (e.g., client-side encrypted data) by calling out to a third-party registered service, such as a security service provider 106, to enable access to the client-side encrypted data. The security service provider 106 may serve the web application 125 associated with the data to the client device and enable most, if not all, functionality of the web application 125. On the client device 102, the web application 125 may appear to be the in-browser web application 135.

Security service provider 106 may be configured to manage security for data being transmitted between the client device 102 and the cloud service provider 104 via network 108. As described above, a security service provider 106 may have authorization to access client-side encrypted data stored in the cloud, and to encrypt and decrypt the client-side encrypted data using client-side encryption keys. Security service provider 106 may be configured to intercept data sent by the client device 102 for storage in the cloud service provider 104, to encrypt the data using a client-side encryption, and to send the client-side encrypted data for storage in secured storage 138 in the cloud. Security service provider 106 may be further configured to decrypt client-encrypted data stored in the cloud service provider 104 based on a client request to view and/or modify client-side encrypted data stored in the cloud. Security service provider 106 may include a web application 125 that launches the in-browser web application 135, such that the client-side encrypted data may be decrypted, may be viewed and/or modified via the in-browser web application 135, and, if modified, the modified data may be encrypted and synchronized to the original storage location in the cloud. As used herein, the term "synchronized" refers to replacing or overwriting original data. In an illustrative example, based on a request from a client device to access the client-side encrypted data in the cloud, the security service provider 106 may be configured to access the data, decrypt the data, store the decrypted data in a temporary location in the cloud, and make the data available to the client device via the in-browser web application 135 associated with the data. Security service provider 106 may act as a proxy between the client device 102 and the cloud service provider 104, such that the web application 125 on the security service provider 106 launches the in-browser web application 135 on the cloud service provider 104 and provides the client device 102 with viewing and/or modifying of client-side encrypted data stored in the cloud using the in-browser web application 135 in the cloud service provider 104. For example, the security service provider 106 monitors a client device 102, intercepts a request by the client device 102 to view and/or modify client-encrypted data in the cloud, decrypts the data, stores the data in a temporary location in the cloud, and invokes the web application 125 to launch the in-browser web application 135 to enable viewing and/or editing of the decrypted data.

Figure 1B:
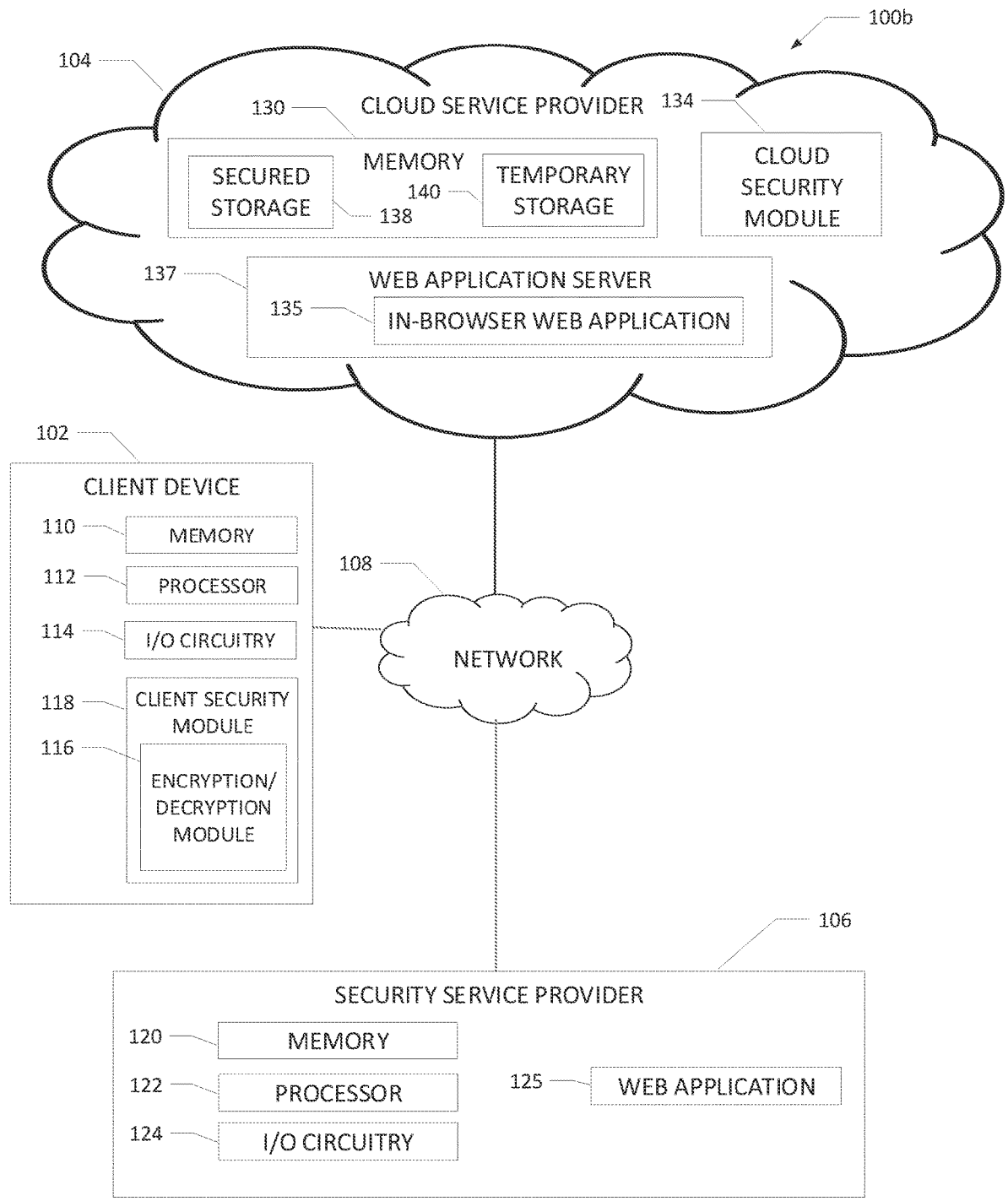
FIG. 1B is a simplified block diagram of another example communication system for a security service provider, in accordance with an embodiment of the present disclosure.

FIG. 1B is a simplified block diagram of a communication system 100b that enables viewing and/or modifying of client-encrypted data stored in the cloud, in accordance with an embodiment of the present disclosure. As illustrated in FIG. 1B, an embodiment of communication system 100b may include a client device 102, cloud service provider 104, and a security service provider 106. Client device 102 may be an electronic device and may include memory 110, a processor 112, I/O circuitry 114, and a client security module 118. Client security module 118 may include an encryption/decryption module 116 for performing client-encryption of data at the client device. Cloud service provider 104 may include memory 130, a cloud security module 134, a web application server 137, and an in-browser web application 135. The cloud security module 134 may perform cloud-based encryption of data received for storage in the cloud. Memory 130 may include secured storage 138 and temporary storage 140. Security service provider 106 may include memory 120, a processor 122, I/O circuitry 124, and a web application 125. Electronic device 102, cloud service provider 104, and security service provider 106 may be in communication using network 108.

Client device 102 may be configured to manage security for data being transmitted between the client device 102 and the cloud service provider 104 via network 108. The client security module 118 may encrypt data using a first client encryption key, send the client-encrypted data for storage in secured storage 138 in the cloud, and may download and decrypt the client-encrypted data. Based on a request by the client device 102 to access client-encrypted data stored in the cloud, the cloud service provider 104 via the web application server 137 may cause web application 125 on the security service provider 106 to be served to the client device 102, as described above with reference to FIG. 1A. Security service provider 106 may include a web application 125 associated with the client-encrypted data stored in the cloud, such that subsequent to the client device 102 decrypting the client-encrypted data and storing the decrypted data in a temporary location in the cloud, the web application 125 may launch the in-browser web application 135, such that the decrypted data may be viewed and/or modified via the in-browser web application 135 on the cloud service provider 104, and, if modified, the modified data may be encrypted using a second client encryption key and synchronized to the original storage location in the cloud by the client device 102. In some embodiments, the first client encryption key is the same as the second client encryption key. In some embodiments, the first client encryption key is different from the second client encryption key. In an illustrative example, based on a request from a client device 102 to access the client-encrypted data in the cloud, the client device 102 may be configured to download the client-encrypted data, decrypt the data, store the decrypted data in a temporary location in the cloud, and make the decrypted data available to the client device 102. Security service provider 106 may act as a proxy between the client device 102 and the cloud service provider 104, where the web application 125 on the security service provider 106 launches the in-browser web application 135 on the cloud service provider 104 and provides the client device with the viewing and/or modifying of client-side encrypted data.

Figure 2:
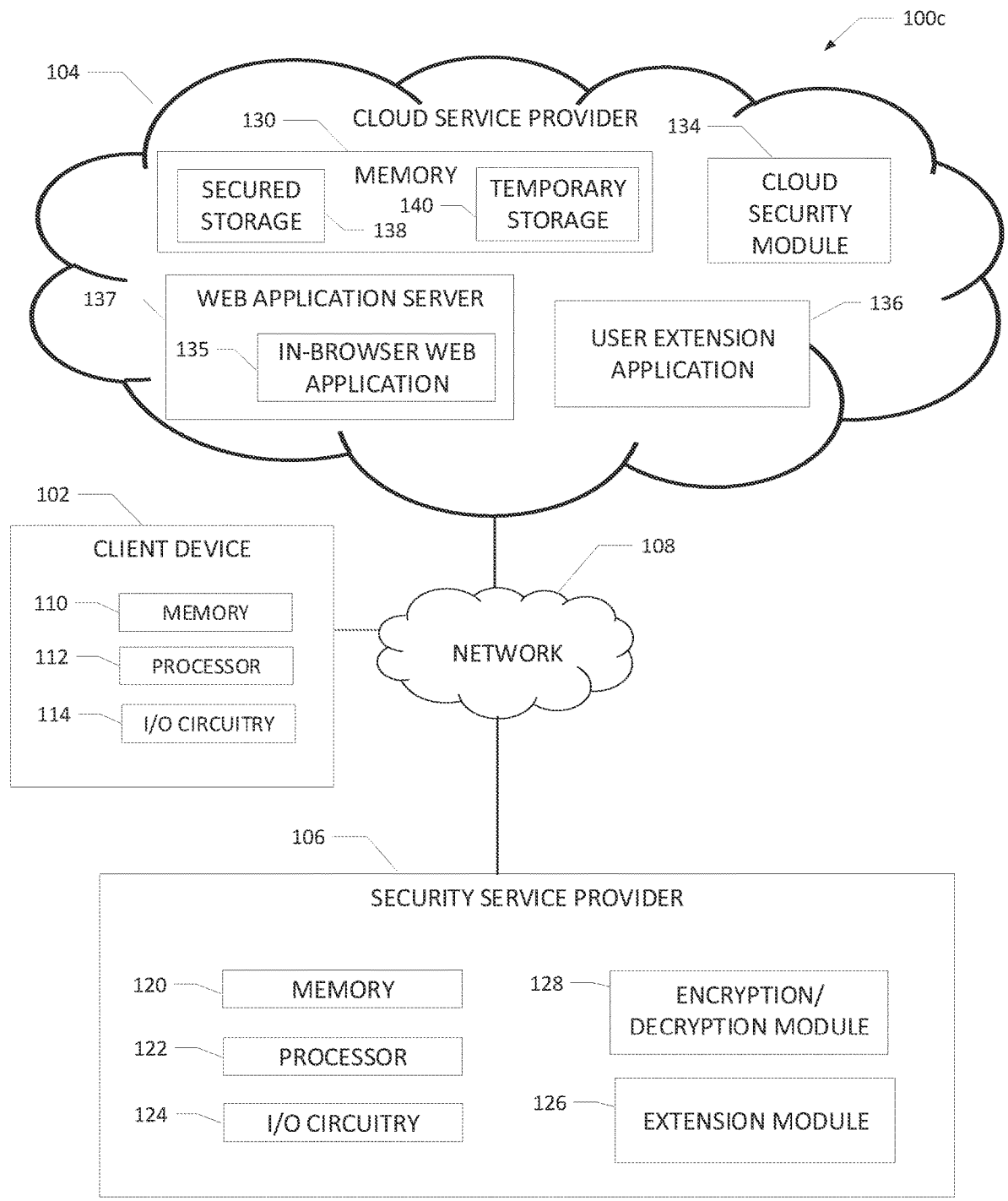
FIG. 2 is a simplified block diagram of another example of a communication system for a security service provider, in accordance with an embodiment of the present disclosure.

FIG. 2 is a simplified block diagram of a communication system 100c that enables viewing and/or modifying of client-side encrypted data stored in a cloud, in accordance with an embodiment of the present disclosure. As illustrated in FIG. 2, an embodiment of communication system 100c may include a client device 102, cloud service provider 104, and a security service provider 106. Client device 102 may be an electronic device and may include memory 110, a processor 112, and I/O circuitry 114. Cloud service provider 104 may include memory 130, a cloud security module 134, a web application server 137, and a user extension application 136. Web application server 137 may include an in-browser web application 135. The user extension application 136, also referred to herein as "a user plug-in," enables the cloud service provider 104 to delegate the viewing and/or modifying of client-side encrypted data to an extension module 126 provided by the security service provider 106. Memory 130 may include secured storage 138 and temporary storage 140. Security service provider 106 may include memory 120, a processor 122, I/O circuitry 124, an encryption/decryption module 128, and an extension module 126. The extension module 126 along with the user extension application 136 may customize the in-browser web application 135 to enable viewing and/or modifying of client-side encrypted data. Electronic device 102, cloud service provider 104, and security service provider 106 may be in communication using network 108.

Security service provider 106 may be configured to manage security for data being transmitted between the client device 102 and the cloud service provider 104 via network 108, as described above with reference to FIG. 1A. In an illustrative example, based on a request from a client device 102 to access the client-side encrypted data in the cloud, the security service provider 106 may be configured using the extension module 126 in conjunction with the user extension application 136 to access the data, decrypt the data, store the decrypted data, make the data available to the client device via the in-browser web application 135 having most, if not all, functionality enabled, and, if modified, to encrypt the modified data and synchronize to the cloud.

Elements of FIGS. 1 and 2 may be coupled to one another through one or more interfaces employing any suitable connections (wired or wireless), which provide viable pathways for network (e.g., network 108, etc.) communications. Additionally, any one or more of these elements of FIGS. 1 and 2 may be combined or removed from the architecture based on particular configuration needs. Communication systems 100a, 100b, and 100c may include a configuration capable of transmission control protocol/Internet protocol (TCP/IP) communications for the transmission or reception of packets in a network. Communication system systems 100a, 100b, and 100c may also operate in conjunction with a user datagram protocol/IP (UDP/IP) or any other suitable protocol where appropriate and based on particular needs.

Turning to the infrastructure of FIGS. 1 and 2, communication systems 100a, 100b, and 100c in accordance with an example embodiment is shown. Generally, communication systems 100a, 100b, and 100c may be implemented in any type or topology of networks. Network 108 represents a series of points or nodes of interconnected communication paths for receiving and transmitting packets of information that propagate through communication systems 100a, 100b, and 100c. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication systems 100a, 100b, and 100c, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication systems 100a, 100b, and 100c. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud service provider 104, and security service provider 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication systems 100a, 100b, and 100c, each of electronic device 102, cloud service provider 104, and security service provider 106 may include memory elements for storing information to be used in the operations outlined herein. Each of electronic device 102, cloud service provider 104, and security service provider 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication systems 100a, 100b, and 100c could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication systems 100a, 100b, and 100c, such as electronic device 102, cloud service provider 104, and security service provider 106 may include software modules (e.g., client security module 118, cloud security module 134) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud service provider 104, and security service provider 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 may be a network element and include, for example, desktop computers, laptop computers, mobile devices, personal digital assistants, smartphones, tablets, or other similar devices. Cloud service provider 104 may be configured to provide cloud service provider to electronic device 102. Cloud service provider may generally be defined as the use of computing resources that are delivered as a service over a network, such as the Internet. Typically, compute, storage, and network resources are offered in a cloud infrastructure, effectively shifting the workload from a local network to the cloud network. In some embodiments, the security service provider 106 may determine whether the cloud service provider 104 is a trusted provider. For example, a manual provisioning operation may be performed to establish trust between the cloud service provider 104 and the security service provider 106, and an authorized administrator may manually configure a trust relationship allowing the security service provider to access client data stored within the cloud service provider on behalf of the client. A security token granted during the provisioning may provide ongoing trusted status to a trusted provider. Security service provider may include a network element such as a server or virtual server and can be associated with clients, customers, endpoints, or end users wishing to initiate a communication in communication system 100a, 100b, and 100c via some network (e.g., network 108). The term 'server' is inclusive of devices used to serve the requests of clients and/or perform some computational task on behalf of clients within communication systems 100a, 100b, and 100c. Although client security module 118 is represented in FIG. 1B as being located in electronic device 102, this is for illustrative purposes only. Client security module 118 may be combined or separated in any suitable configuration. Furthermore, client security module 118 may be integrated with or distributed in another network accessible by electronic device 102.

Figure 3A:
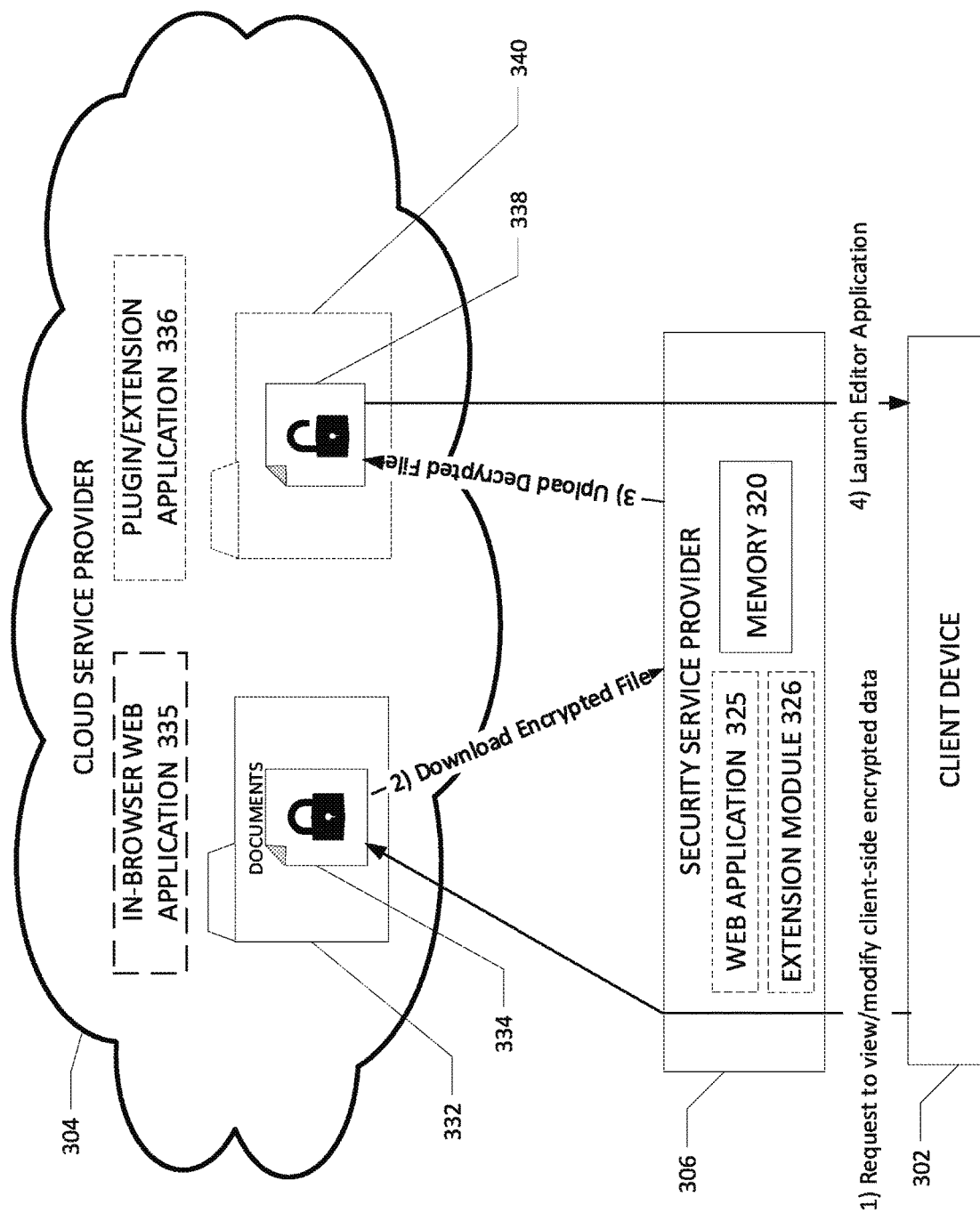
FIGS. 3A and 3B are simplified block diagrams illustrating potential operations that may be associated with the communication system in accordance with an embodiment.

FIG. 3A is a simplified block diagram of a portion of a communication system for a client device initiating a modification of client-side encrypted data stored in the cloud, in accordance with an embodiment of the present disclosure. As illustrated in FIG. 3A, the cloud service provider 304 may include secured storage locations 332, such as Documents folder, and temporary storage locations 340, as depicted by the dotted lines. The cloud service provider 304 may store client-side encrypted data 334 in the secured storage locations 332. A security service provider 306 may act as a proxy between the cloud service provider 304 and the client device 302. The client device 302 requests to access and/or modify client-side encrypted data 334 stored in the cloud via the in-browser web application 335 in the cloud service provider or via the web application 325 in the security service provider 306. The security service provider 306 receives notification from the cloud service provider 304 that the client device 302 is requesting access to the client-side encrypted data 334. In some embodiments, the notification that the client device 302 is requesting access to the client-side encrypted data 334 may be made via the in-browser web application 335 and may be received via the plugin/extension application 336. In some embodiments, the notification that the client device 302 is requesting access to the client-side encrypted data 334 may be made and may be received via the web application 325. In response to receiving notification that the client device 302 is requesting to access to client-side encrypted data 334 stored in the cloud, the security service provider 306 may download the client-side encrypted data to memory 320 or a temporary file location and may decrypt the data by retrieving a client-side encryption key. Subsequent to decrypting the data, the security service provider 306 may upload the decrypted data 338 to the cloud service provider 304 for storage in the temporary storage location 340. The in-browser web application 335 via the plugin/extension 326 or the web application 325 may redirect the client's browser to view and/or modify the decrypted data 338 in the temporary storage location 340, such that the client may view and/or modify the decrypted data via the in-browser web application 335 in the cloud service provider 304. In some embodiments, for example, when the client device 302 performs client-encryption, the client device 302 may interface with the cloud service provider 304 via an API to download and upload encrypted and decrypted files between the client device 302 and the cloud service provider 304.

Figure 3B:
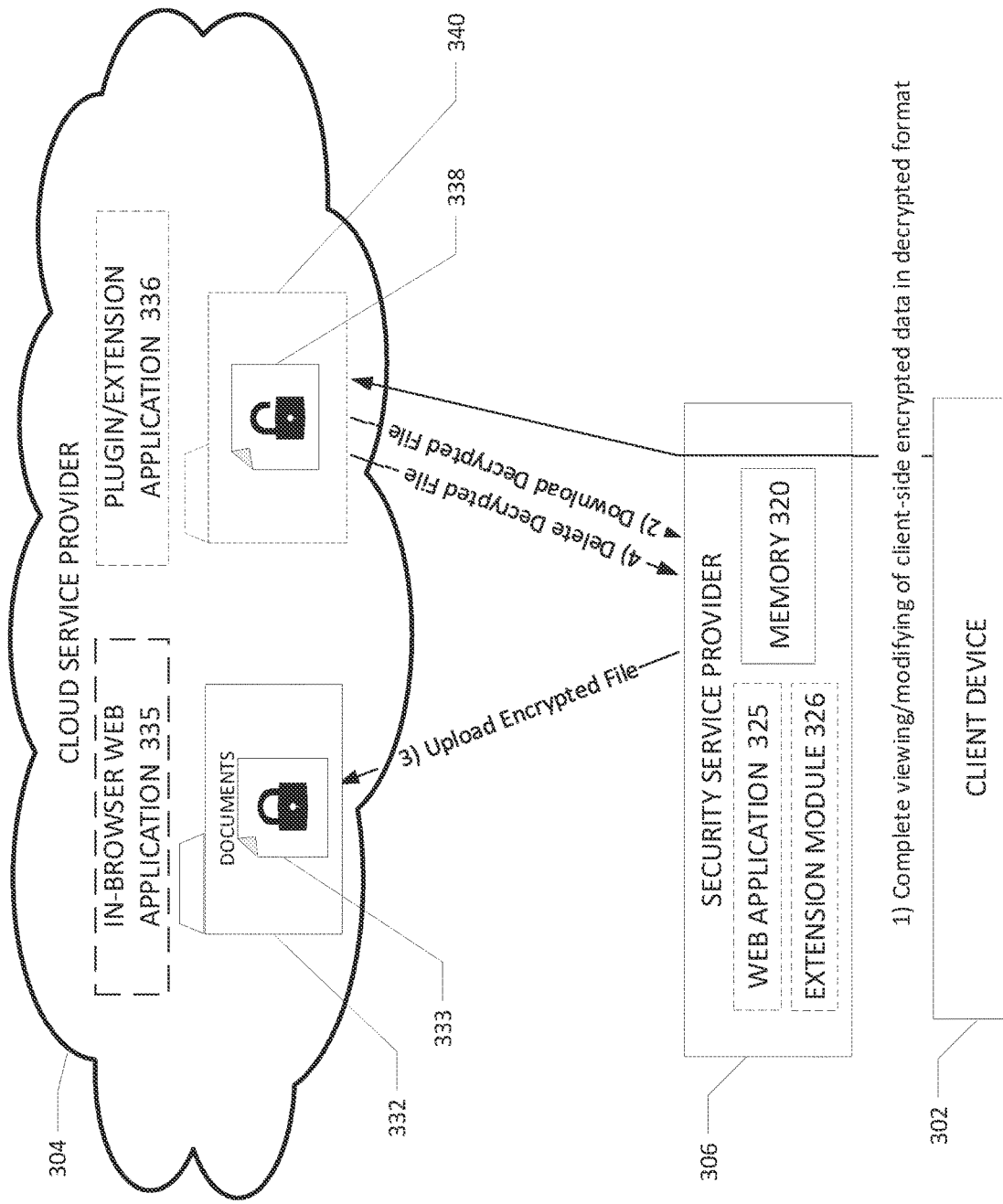

FIG. 3B is a simplified block diagram of a portion of a communication system for a client device completing a modification of client-side encrypted data stored in the cloud, in accordance with an embodiment of the present disclosure. As illustrated in FIG. 3B, the client device 302 finishes accessing the decrypted data 338 stored in the temporary location 340 in the cloud. In response to receiving notification that the client device is done modifying the decrypted data 338, the security service provider 306 may download the modified decrypted data to memory 320 or a temporary file location and may encrypt the modified data by retrieving a client-side encryption key. In some embodiments, the modified data may be classified prior to encryption. For example, modified data may be classified using a classification module, such as McAfee Data Loss Prevention (DLP), which may classify data as confidential data, medical data, financial data, or personal data, among others, and may select an encryption key for encrypting the modified data based on the resulting classification. Subsequent to encrypting the modified data, the security service provider 306 may upload and synchronize the client-side encrypted modified data 333 to the original secured storage location 332 of the client-side encrypted data (e.g., data 334 of FIG. 3A), such that the original data is replaced by the modified data. The security service provider 306 may delete the decrypted data 338 from the temporary storage location 340. In some embodiments, the plugin/extension 326 or web application 325 may filter the visibility of the temporary storage location 340 in the cloud service provider 304, such that the decrypted data 338 may not be visible to the client device 302. In some embodiments, for example, when the client device 302 performs client-encryption, the client device 302 may interface with the cloud service provider via an API to download and upload encrypted and decrypted files between the client device 302 and the cloud service provider 304. In some embodiments, as described below in reference to FIG. 4, the decrypted data may not be modified (e.g., viewed, not edited), and the original data may be replaced by the re-encrypted data. In some embodiments, as described below in reference to FIG. 5, the decrypted data may not be modified (e.g., viewed, not edited), and, based on a determination that the decrypted data is not modified, the original data may not be replaced by the re-encrypted data.

Figure 4:
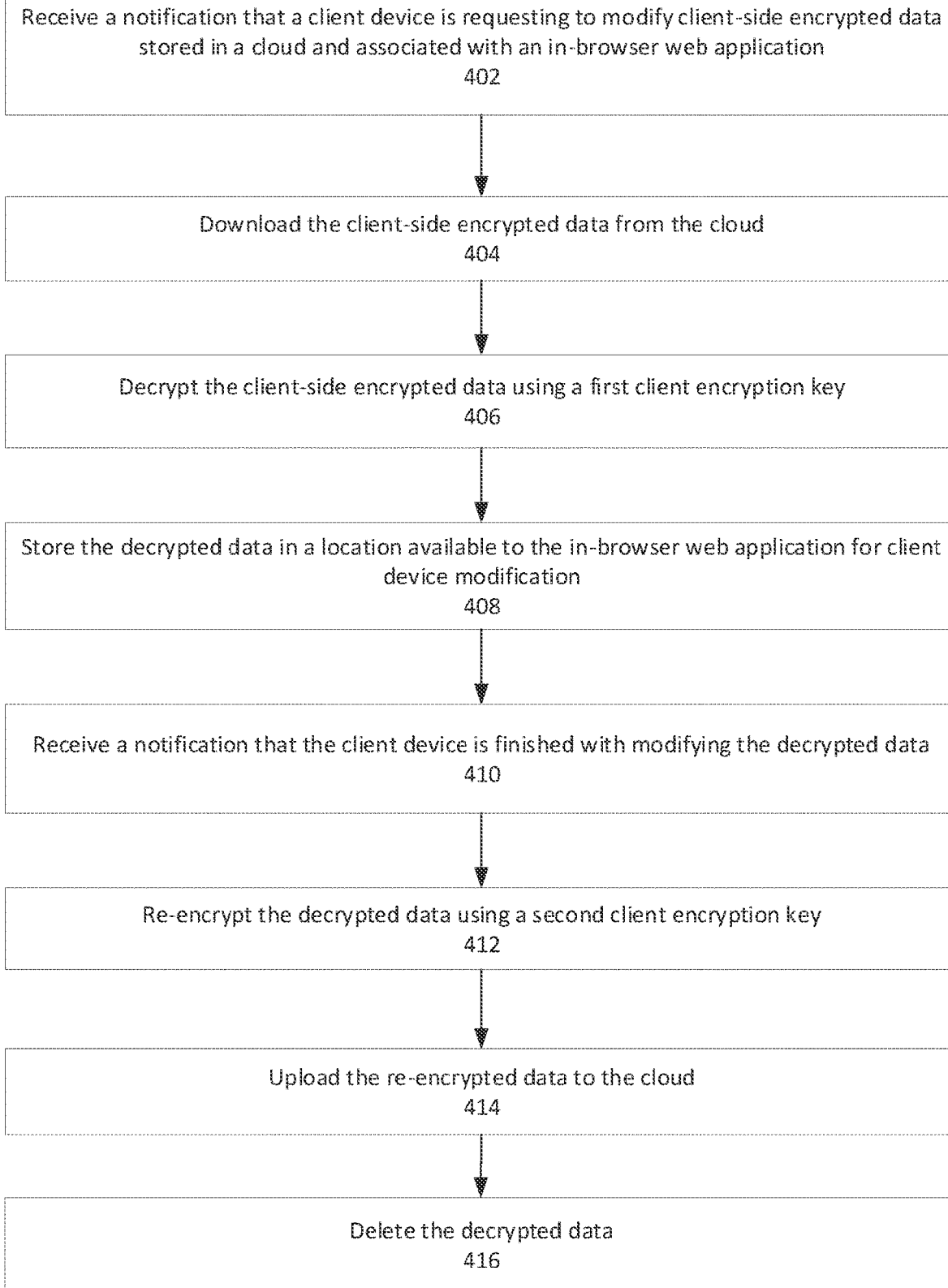
FIG. 4 is a simplified flowchart illustrating potential operations that may be associated with the communication system in accordance with an embodiment.

FIG. 4 is an example flowchart illustrating possible operations that may be associated with modifying client-side encrypted data stored in a cloud via an in-browser web application associated with the client-side encrypted data, in accordance with an embodiment. In an embodiment, one or more operations may be performed by security service provider 106. At 402, notification is received that a client device is requesting to modify client-side encrypted data stored in a cloud and associated with an in-browser web application hosted by the cloud service provider. In some embodiments, the notification may be received from a plugin or extension hosted by the cloud service provider platform. In some embodiments, the notification may be received from a web application hosted by a proxy that is between the client device and the cloud service provider. At 404, the client-side encrypted data requested by the client device is downloaded from the cloud service provider. The client-side encrypted data may be downloaded to the platform hosting the security service provider, to the client device, or to another network server accessible by the security service provider. At 406, the client-side encrypted data is decrypted using a first client encryption key. At 408, the decrypted data is stored in a location accessible by the in-browser web application and may enable modification of the decrypted data by the client device. In some embodiments, the decrypted data may be stored in a temporary location in the cloud. At 410, a notification that the client device is finished accessing the decrypted data is received. At 412, the decrypted data is re-encrypted using a second client encryption key. In some embodiments, the first client encryption key is the same as the second client encryption key. In some embodiments, the first client encryption key is different from the second client encryption key. At 414, the re-encrypted data is uploaded to the cloud for storage. The re-encrypted data is uploaded and stored in the original client-side encrypted data location, such that re-encrypted data replaces the client-side encrypted data that was requested by the client device. At 416, the decrypted data is deleted from the location accessible by the in-browser web application.

Figure 5:
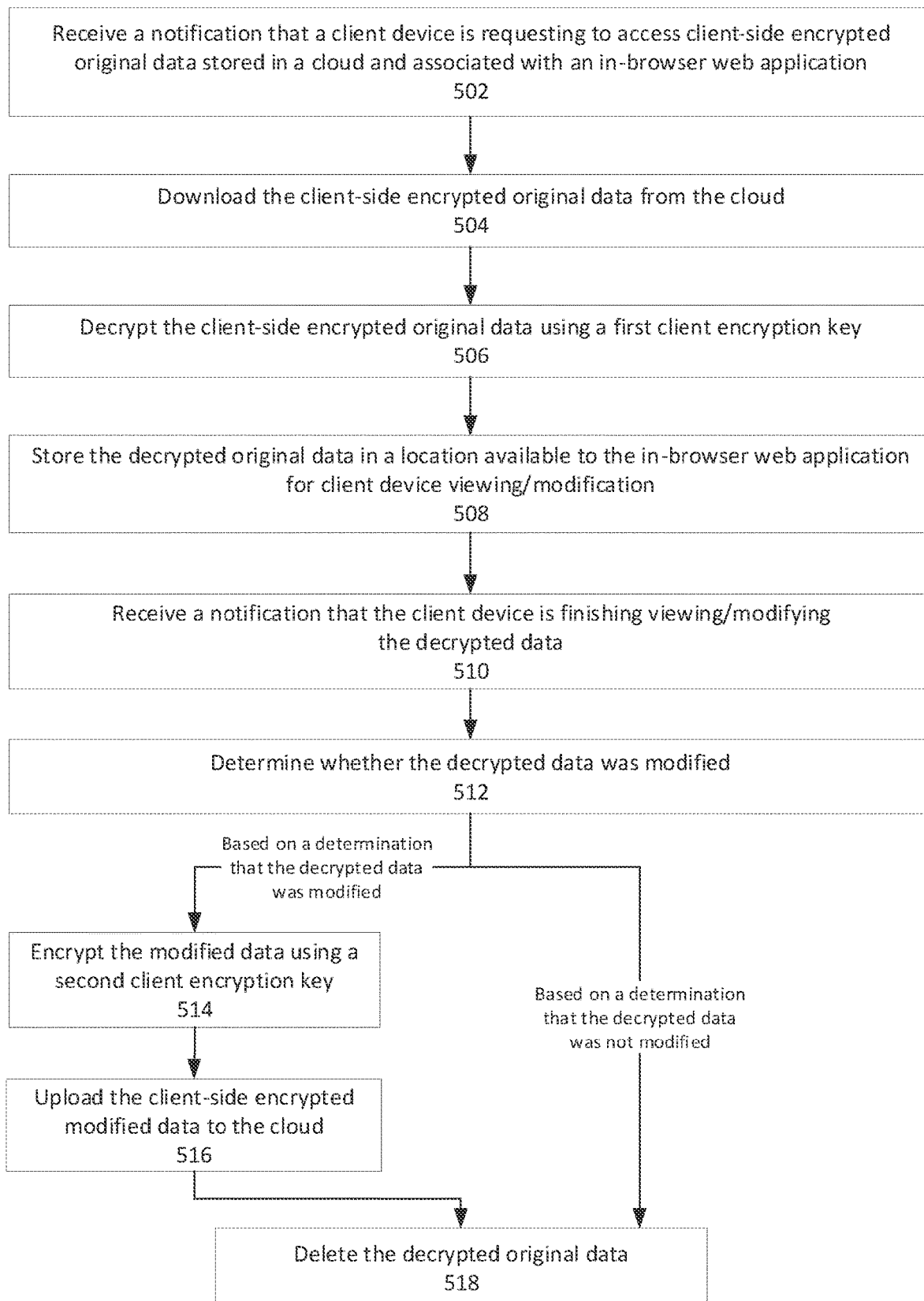
FIG. 5 is a simplified flowchart illustrating potential operations that may be associated with the communication system in accordance with an embodiment.

FIG. 5 is an example flowchart illustrating possible operations that may be associated with viewing and/or modifying client-side encrypted data stored in a cloud via an in-browser web application associated with the client-side encrypted data, in accordance with an embodiment. In an embodiment, one or more operations may be performed by security service provider 106. At 502, notification is received that a client device is requesting to access client-side encrypted original data stored in a cloud and associated with an in-browser web application hosted by the cloud service provider. In some embodiments, the notification may be received from a plugin or extension hosted by the cloud service provider platform. In some embodiments, the notification may be received from a web application hosted by a security service provider (e.g., a proxy) that is between the client device and the cloud service provider. At 504, the client-side encrypted original data requested by the client device is downloaded from the cloud service provider. The client-side encrypted data may be downloaded to the platform hosting the security service provider, to the client device, or to another network server accessible by the security service provider. At 506, the client-side encrypted original data is decrypted using a first client encryption key. At 508, the decrypted original data is stored in a location accessible by the in-browser web application and may enable modification of the decrypted data by the client device. In some embodiments, the decrypted data may be stored in a temporary location in the cloud. At 510, a notification that the client device is finished viewing and/or modifying the decrypted data is received. At 512, a determination as to whether the decrypted data was modified is made. For example, the decrypted data may be compared to the original data as downloaded (e.g., at 504). At 514, based on a determination that the decrypted data was modified, the decrypted modified data is encrypted using a second client encryption key. In some embodiments, the first client encryption key is the same as the second client encryption key. In some embodiments, the first client encryption key is different from the second client encryption key. At 516, the client-side encrypted modified data is uploaded to the cloud for storage. The client-side encrypted modified data is uploaded and stored in the client-side encrypted original data location, such that client-side encrypted modified data replaces the client-side encrypted original data that was requested by the client device. At 518, the decrypted original data is deleted from the location accessible by the in-browser web application. Based on a determination that the decrypted data was not modified, the decrypted data may be deleted as in 518.

Figure 6:
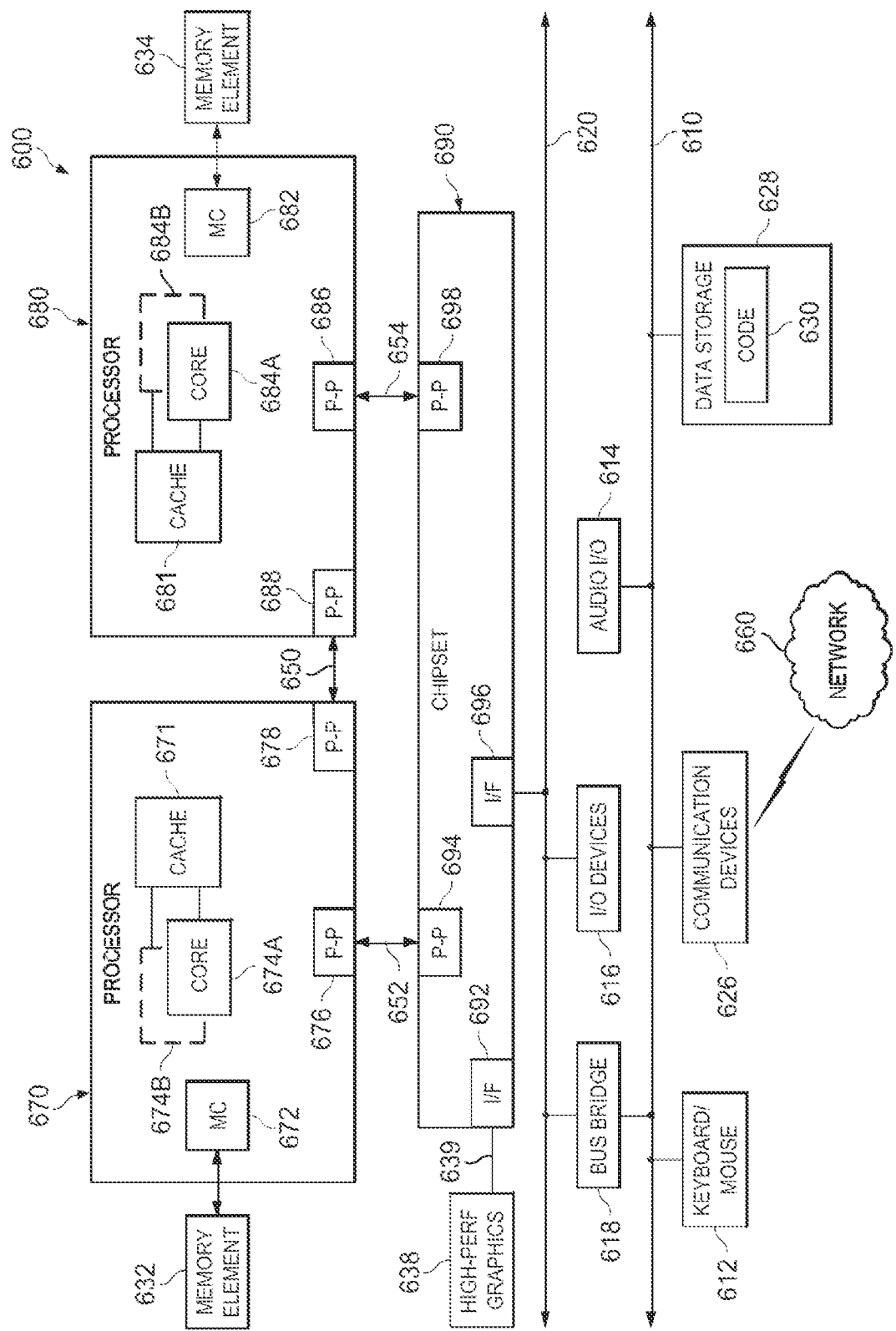
FIG. 6 is a block diagram illustrating an example computing system that is arranged in a point-to-point configuration in accordance with an embodiment.

FIG. 6 illustrates a computing system 600 that is arranged in a point-to-point (PtP) configuration according to an embodiment. In particular, FIG. 6 shows a system where processors, memory, and input/output devices are interconnected by a number of point-to-point interfaces. Generally, one or more of the network elements of communication systems 100a, 100b, and 100c may be configured in the same or similar manner as computing system 600.

As illustrated in FIG. 6, system 600 may include several processors, of which only two, processors 670 and 680, are shown for clarity. While two processors 670 and 680 are shown, it is to be understood that an embodiment of system 600 may also include only one such processor. Processors 670 and 680 may each include a set of cores (i.e., processor cores 674A and 674B and processor cores 684A and 684B) to execute multiple threads of a program. The cores may be configured to execute instruction code in a manner similar to that discussed above with reference to FIGS. 1-5. Each processor 670, 680 may include at least one shared cache 671, 681. Shared caches 671, 681 may store data (e.g., instructions) that are utilized by one or more components of processors 670, 680, such as processor cores 674 and 684.

Processors 670 and 680 may also each include integrated memory controller logic (MC) 672 and 682 to communicate with memory elements 632 and 634. Memory elements 632 and/or 634 may store various data used by processors 670 and 680. In alternative embodiments, memory controller logic 672 and 682 may be discrete logic separate from processors 670 and 680.

Processors 670 and 680 may be any type of processor and may exchange data via a point-to-point (PtP) interface 650 using point-to-point interface circuits 678 and 688, respectively. Processors 670 and 680 may each exchange data with a chipset 690 via individual point-to-point interfaces 652 and 654 using point-to-point interface circuits 676, 686, 694, and 698. Chipset 690 may also exchange data with a high-performance graphics circuit 638 via a high-performance graphics interface 639, using an interface circuit 692, which could be a PtP interface circuit. In alternative embodiments, any or all of the PtP links illustrated in FIG. 6 could be implemented as a multi-drop bus rather than a PtP link.

Chipset 690 may be in communication with a bus 620 via an interface circuit 696. Bus 620 may have one or more devices that communicate over it, such as a bus bridge 618 and I/O devices 616. Via a bus 610, bus bridge 618 may be in communication with other devices such as a keyboard/mouse 612 (or other input devices such as a touch screen, trackball, etc.), communication devices 626 (such as modems, network interface devices, or other types of communication devices that may communicate through a computer network 660), audio I/O devices 614, and/or a data storage device 628. Data storage device 628 may store code 630, which may be executed by processors 670 and/or 680. In alternative embodiments, any portions of the bus architectures could be implemented with one or more PtP links.

The computer system depicted in FIG. 6 is a schematic illustration of an embodiment of a computing system that may be utilized to implement various embodiments discussed herein. It will be appreciated that various components of the system depicted in FIG. 6 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 7:
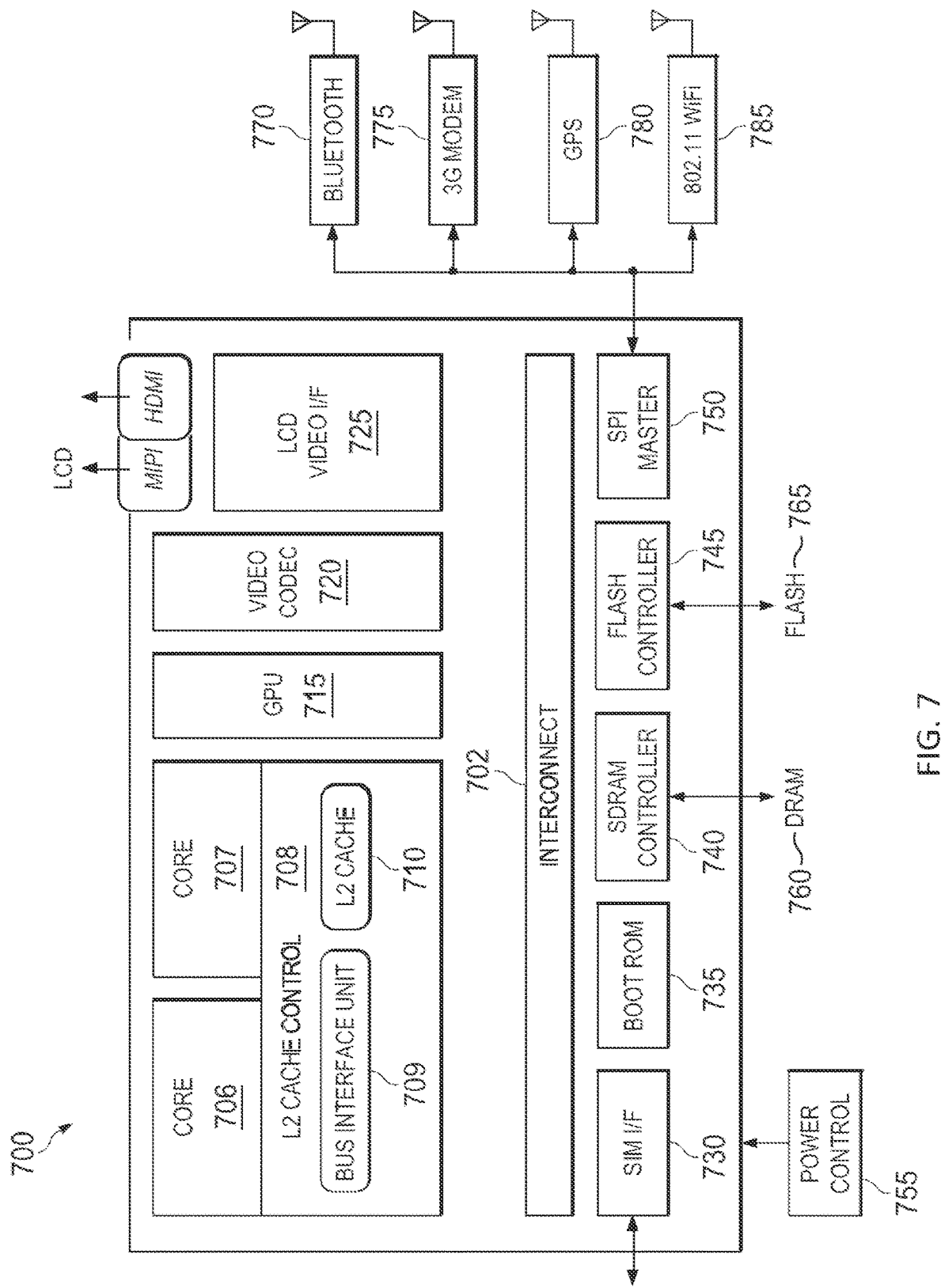
FIG. 7 is a simplified block diagram associated with an example ecosystem system on chip (SOC) of the present disclosure.

FIG. 7 is a simplified block diagram associated with an example ARM ecosystem SOC 700 of the present disclosure. At least one example implementation of the present disclosure can include the virtualized trusted storage features discussed herein and an ARM component. For example, the example of FIG. 7 can be associated with any ARM core (e.g., A-7, A-15, etc.). Further, the architecture can be part of any type of tablet, smartphone (inclusive of Android™ phones, iPhones™), iPad™, Google Nexus™, Microsoft Surface™, personal computer, server, video processing components, laptop computer (inclusive of any type of notebook), Ultrabook™ system, any type of touch-enabled input device, etc.

In this example of FIG. 7, ARM ecosystem SOC 700 may include multiple cores 706-707, an L2 cache control 708, a bus interface unit 709, an L2 cache 710, a graphics processing unit (GPU) 715, an interconnect 702, a video codec 720, and a liquid crystal display (LCD) I/F 725, which may be associated with mobile industry processor interface (MIPI)/high-definition multimedia interface (HDMI) links that couple to an LCD.

ARM ecosystem SOC 700 may also include a subscriber identity module (SIM) I/F 730, a boot read-only memory (ROM) 735, a synchronous dynamic random access memory (SDRAM) controller 740, a flash controller 745, a serial peripheral interface (SPI) master 750, a suitable power control 755, a dynamic RAM (DRAM) 760, and flash 765. In addition, one or more embodiments include one or more communication capabilities, interfaces, and features such as instances of Bluetooth™ 770, a 3G modem 775, a global positioning system (GPS) 780, and an 802.11 Wi-Fi 785.

In operation, the example of FIG. 7 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe® Flash® Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 8:
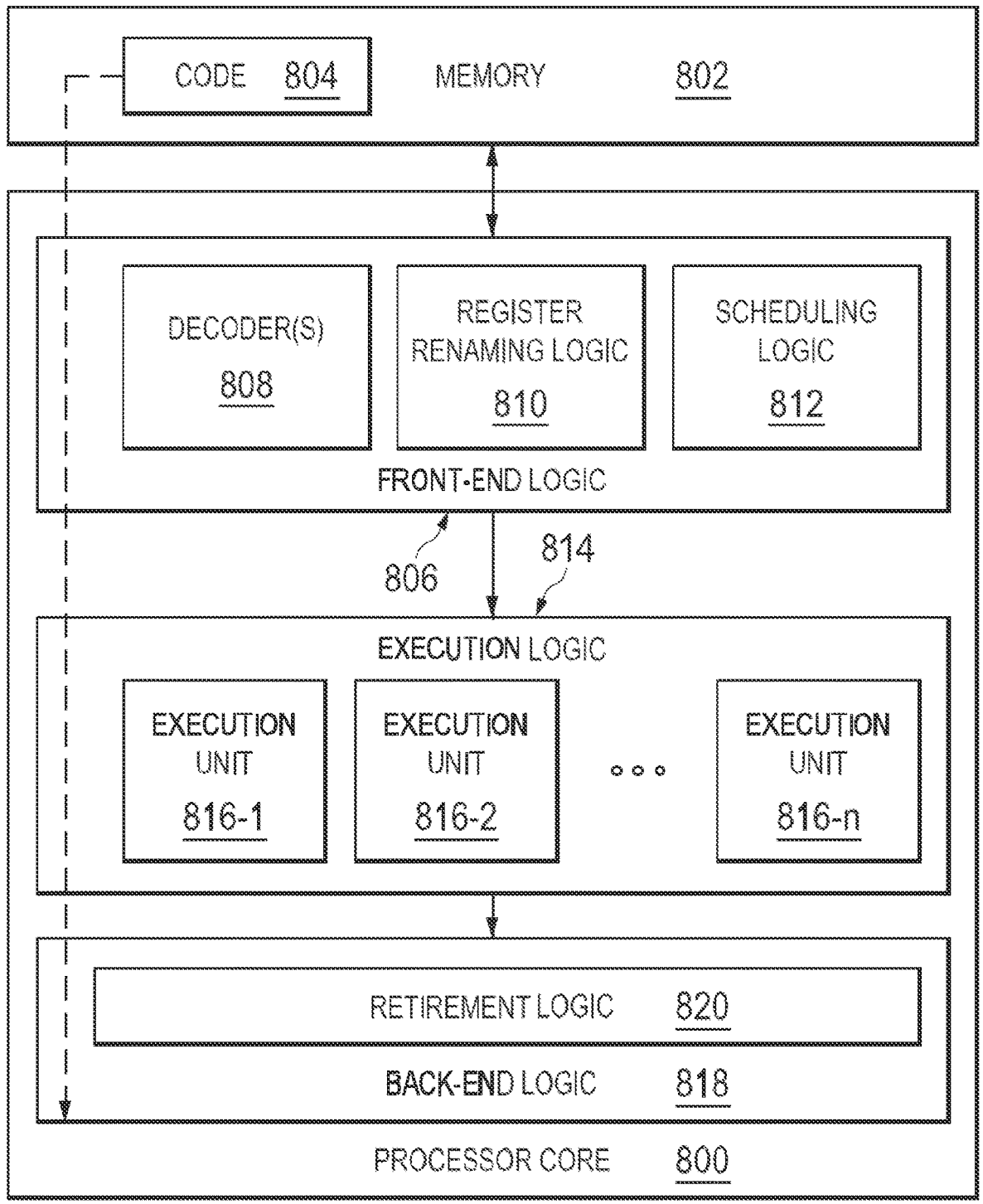
FIG. 8 is a block diagram illustrating an example processor core in accordance with an embodiment.

FIG. 8 illustrates a processor core 800 according to an embodiment. Processor core 800 may be the core for any type of processor, such as a micro-processor, an embedded processor, a digital signal processor (DSP), a network processor, or other device to execute code. Although only one processor core 800 is illustrated in FIG. 8, a processor may alternatively include more than one of the processor core 800 illustrated in FIG. 8. For example, processor core 800 represents one example embodiment of processors cores 674a, 674b, 684a, and 684b shown and described with reference to processors 670 and 680 of FIG. 6. Processor core 800 may be a single-threaded core or, for at least one embodiment, processor core 800 may be multithreaded in that it may include more than one hardware thread context (or "logical processor") per core.

FIG. 8 also illustrates a memory 802 coupled to processor core 800 in accordance with an embodiment. Memory 802 may be any of a wide variety of memories (including various layers of memory hierarchy) as are known or otherwise available to those of skill in the art. Memory 802 may include code 804, which may be one or more instructions, to be executed by processor core 800. Processor core 800 can follow a program sequence of instructions indicated by code 804. Each instruction enters a front-end logic 806 and is processed by one or more decoders 808. The decoder may generate, as its output, a micro operation such as a fixed width micro operation in a predefined format, or may generate other instructions, microinstructions, or control signals that reflect the original code instruction. Front-end logic 806 also includes register renaming logic 810 and scheduling logic 812, which generally allocate resources and queue the operation corresponding to the instruction for execution.

Processor core 800 can also include execution logic 814 having a set of execution units 816-1 through 816-N. Some embodiments may include a number of execution units dedicated to specific functions or sets of functions. Other embodiments may include only one execution unit or one execution unit that can perform a particular function. Execution logic 814 performs the operations specified by code instructions.

After completion of execution of the operations specified by the code instructions, back-end logic 818 can retire the instructions of code 804. In one embodiment, processor core 800 allows out of order execution but requires in order retirement of instructions. Retirement logic 820 may take a variety of known forms (e.g., re-order buffers or the like). In this manner, processor core 800 is transformed during execution of code 804, at least in terms of the output generated by the decoder, hardware registers and tables utilized by register renaming logic 810, and any registers (not shown) modified by execution logic 814.

Although not illustrated in FIG. 8, a processor may include other elements on a chip with processor core 800, at least some of which were shown and described herein with reference to FIG. 6. For example, as shown in FIG. 6, a processor may include memory control logic along with processor core 800. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication systems 100a, 100b, and 100c and its teachings are readily scalable and can accommodate a large number of components, as well as more complicated/sophisticated arrangements and configurations. Accordingly, the examples provided should not limit the scope or inhibit the broad teachings of communication systems 100a, 100b, and 100c as potentially applied to a myriad of other architectures.

It is also important to note that the operations in the preceding flow diagrams (i.e., FIGS. 4 and 5) illustrate only some of the possible correlating scenarios and patterns that may be executed by, or within, communication systems 100a, 100b, and 100c. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems 100a, 100b, and 100c in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication systems 100a, 100b, and 100c has been illustrated with reference to particular elements and operations that facilitate the communication process, these elements and operations may be replaced by any suitable architecture, protocols, and/or processes that achieve the intended functionality of communication systems 100a, 100b, and 100c Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example 1 is at least one non-transitory machine-readable medium including one or more instructions that when executed by a processor, cause the processor to: receive a notification that a client device is requesting to access data associated with an online application, wherein the data is stored in encrypted format on a cloud service provider; download the data; decrypt the data using a first client encryption key; store the data in decrypted format in a location accessible by the online application; enable access to the data in decrypted format; receive a notification that the client device finished accessing the data in decrypted format; encrypt the decrypted data using a second client encryption key; and upload and synchronize the data in encrypted format to the cloud service provider.

Example 2 may include the subject matter of claim 1, and may further include one or more instructions that when executed by the processor, cause the processor to: delete the data in decrypted format from the location accessible by the online application.

Example 3 may include the subject matter of claim 1, and may further include one or more instructions that when executed by the processor, cause the processor to: determine whether the data in decrypted format was modified.

Example 4 may include the subject matter of claim 1, and may further specify that the client device accesses the decrypted data using an in-browser web application hosted by the cloud service provider via a user extension application.

Example 5 may include the subject matter of claim 1, and may further specify that the client device accesses the decrypted data using an in-browser web application hosted by the cloud service provider, and wherein the in-browser web application is launched by a web application hosted on a different platform from the cloud service provider.

Example 6 may include the subject matter of claim 1, and may further specify that the data in decrypted format is stored in a temporary location in the cloud service provider.

Example 7 may include the subject matter of claim 6, and may further specify that the location of the data in decrypted format is not visible to the client device.

Example 8 is at least one non-transitory machine-readable medium including one or more instructions that when executed by a processor, cause the processor to: receive a notification that a client device is requesting to modify original data associated with an online application, wherein the original data is stored in client-side encrypted format in a cloud; decrypt the original data using a first client encryption key; store the decrypted data in a location accessible by the online application; enable editing capability of the decrypted data; receive a notification that the client device editing the decrypted data; determine whether the original data in decrypted format was modified; encrypt, based on a determination that the original data was modified, the modified data using a second client encryption key; and upload the modified data in client-side encrypted format to the cloud.

Example 9 may include the subject matter of claim 8, and may further include one or more instructions that when executed by the processor, cause the processor to: delete the data in decrypted format from the location accessible by the online application.

Example 10 may include the subject matter of claim 8, and may further specify that the modified data replaces the original data stored in the cloud.

Example 11 may include the subject matter of claim 8, and may further specify that the online application is an in-browser web application, and wherein the in-browser web application is launched by a web application not hosted on a same platform as the cloud.

Example 12 may include the subject matter of claim 8, and may further specify that the data in decrypted format is stored in a temporary location in the cloud.

Example 13 may include the subject matter of claim 8, and may further specify that the first client encryption key and the second client encryption key are the same.

Example 14 may include the subject matter of claim 8, and may further specify that the first client encryption key and the second client encryption key are different.

Example 15 is a method including: receiving a notification that a client device is requesting, to modify original data associated with an online application, wherein the original data is stored in encrypted format in a cloud; downloading the original data; decrypting the original data using a first client encryption key; storing the decrypted data in a location accessible by the online application; enabling editing capability of the decrypted data; receiving a notification that the client device is finished modifying the data in decrypted format; determining whether the original data in decrypted format was modified; encrypting, based on a determination that the original data was modified, the modified data using a second client encryption key; and uploading the modified data in encrypted format to the cloud.

Example 16 may include the subject matter of claim 15, further including: deleting the data in decrypted format from the location accessible by the online application.

Example 17 may include the subject matter of claim 15, and may further specify that the modified data replaces the original data stored in the cloud.

Example 18 may include the subject matter of claim 15, and may further specify that the data in decrypted format is stored in the cloud.

Example 19 may include the subject matter of claim 15, and may further specify that the location of the data in decrypted format is not visible to the client device.

Example 20 is a system for migrating a secure domain, the system including: a secure manager, wherein the secure manager is configured to: receive a notification that a client device is requesting to modify original data associated with an in-browser web application, wherein the original data is stored in encrypted format in a cloud; download the encrypted data; decrypt the original data using a client encryption key; store the decrypted data in a location accessible by the in-browser web application; enable editing capability of the decrypted data; receive a notification that the client device finished modifying the decrypted data; determine whether the original data in decrypted format was modified; encrypt, based on a determination that the original data was modified, the modified data using the client encryption key; and upload the modified data in encrypted format to the cloud.

Example 21 may include the subject matter of claim 20, wherein the secure manager is further configured to: delete the data in decrypted format from the location accessible by the in-browser web application.

Example 22 may include the subject matter of claim 20, and may further specify that the modified data replaces the original data stored in the cloud.

Example 23 may include the subject matter of claim 20, wherein the secure manager is further configured to: classify the modified data prior to encryption.

Example 24 may include the subject matter of claim 20, and may further specify that the data in decrypted format is stored in the cloud.

Example 25 may include the subject matter of claim 20, wherein the secure manager is further configured to: determine whether the cloud is trusted.

What is claimed is:

1. At least one non-transitory machine-readable medium comprising one or more instructions that when executed by a processor, cause the processor to:
    receive a notification that a client device is requesting to access client-side encrypted data associated with an online application stored in a cloud service provider, wherein the client-side encrypted data has been encrypted by a client-authorized device using a first client encryption key;
    decrypt, by the client-authorized device, the client-side encrypted data using the first client encryption key;
    store the client-side decrypted data in a temporary location in the cloud service provider;
    enable access, by the client device and by the online application, to the client-side decrypted data while stored in the cloud service provider;
    encrypt, by the client-authorized device, after the client device finishes accessing the client-side decrypted data, the client-side decrypted data using a second client encryption key; and
    upload, by the client-authorized device, the client-side encrypted data that was encrypted using the second encryption key to the cloud service provider to replace the client-side encrypted data that was encrypted using the first encryption key.

2. The at least one non-transitory machine-readable medium of claim 1, further comprising one or more instructions that when executed by the processor, cause the processor to:
    delete the client-side decrypted data.

3. The at least one non-transitory machine-readable medium of claim 1, further comprising one or more instructions that when executed by the processor, cause the processor to:
    determine whether the client-side decrypted data was modified.

4. The at least one non-transitory machine-readable medium of claim 1, wherein the client device accesses the client-side decrypted data using an in-browser web application hosted by the cloud service provider via a user extension application.

5. The at least one non-transitory machine-readable medium of claim 1, wherein the client device accesses the client-side decrypted data using an in-browser web application hosted by the cloud service provider, and wherein the in-browser web application is launched by a web application hosted on a different platform from the cloud service provider.

6. The at least one non-transitory machine-readable medium of claim 1, wherein the location of the client-side decrypted data is not visible to the client device.

7. The at least one non-transitory machine-readable medium of claim 1, further comprising one or more instructions that when executed by the processor, cause the processor to:
    determine whether the cloud service provider is trusted.

8. At least one non-transitory machine-readable medium comprising one or more instructions that when executed by a processor, cause the processor to:
    receive a notification that a client device is requesting to modify original data associated with an online application, wherein the original data has been encrypted by a client-authorized device using a first client encryption key and is stored in client-side encrypted format in a cloud;
    decrypt, by the client-authorized device, the original data using the first client encryption key;
    store the original data in decrypted format in a temporary location in the cloud;
    enable, by the client device and the online application, access to the original data in decrypted format while stored in the cloud;
    determine, by the client-authorized device, after the client device finishes accessing the original data in decrypted format, whether the original data in decrypted format was modified; and
    delete, by the client-authorized device, based on a determination that the original data in decrypted format was not modified, the original data in decrypted format.

9. The at least one non-transitory machine-readable medium of claim 8, further comprising one or more instructions that when executed by the processor, cause the processor to:
    encrypt, by the client-authorized device based on a determination that the original data was modified, the modified data using a second client encryption key; and
    upload, by the client-authorized device, the modified data in client-side encrypted format to the cloud to replace the original data stored in the cloud.

10. The at least one non-transitory machine-readable medium of claim 8, wherein the online application is an in-browser web application, and wherein the in-browser web application is launched by a web application not hosted on a same platform as the cloud.

11. The at least one non-transitory machine-readable medium of claim 8, wherein the first client encryption key and the second client encryption key are the same.

12. The at least one non-transitory machine-readable medium of claim 8, wherein the first client encryption key and the second client encryption key are different.

13. A system for migrating a secure domain, the system comprising:
    memory; and
    at least one processor implemented in hardware configured to:
        receive a notification that a client device is requesting to access original data associated with an in-browser web application, wherein the original data has been encrypted by a client-authorized device using a first client encryption key and is stored in encrypted format in a cloud;
        decrypt, by the client-authorized device, the original data using the first client encryption key;
        store the original data in decrypted format in the cloud;
        enable access, by the client device and by the in-browser web application, to the original data in decrypted format while stored in the cloud;
        determine, after the client device finishes accessing the original data in decrypted format, whether the original data in decrypted format was modified; and delete, by the client-authorized device, based on a determination that the original data in decrypted format was not modified, the original data in decrypted format.

14. The system of claim 13, wherein the at least one processor is further configured to:
   encrypt, by the client-authorized device, based on a determination that the original data in decrypted format was modified, the modified data using a second client encryption key; and
   upload the modified data in encrypted format to the cloud to replace the original data stored in the cloud.

15. The system of claim 14, wherein the at least one processor is further configured to:
   delete the original data in decrypted format.

16. The system of claim 14, wherein the at least one processor is further configured to:
   classify the modified data prior to encrypting using the second client encryption key.

17. The system of claim 13, wherein the at least one processor is further configured to:
   determine whether the cloud is trusted.

\* \* \* \* \*